United States Patent
Lai et al.

(10) Patent No.: US 12,175,591 B2
(45) Date of Patent: Dec. 24, 2024

(54) METHODS FOR GENERATING THREE-DIMENSIONAL IMAGE DATA OF HUMAN BONES

(71) Applicant: Alpha Intelligence Manifolds, Inc., New Taipei (TW)

(72) Inventors: Yueh-Chun Lai, New Taipei (TW); Win-How Lee, New Taipei (TW)

(73) Assignee: Alpha Intelligence Manifolds, Inc., New Taipei City (TW)

( * ) Notice: Subject to any disclaimer, the term of this patent is extended or adjusted under 35 U.S.C. 154(b) by 48 days.

(21) Appl. No.: 17/835,950

(22) Filed: Jun. 8, 2022

(65) Prior Publication Data

US 2022/0392149 A1    Dec. 8, 2022

(30) Foreign Application Priority Data

Jun. 8, 2021    (TW) .................................. 110120781

(51) Int. Cl.
    *G06T 15/08*      (2011.01)
    *G06T 7/70*      (2017.01)
    *G06T 19/20*      (2011.01)

(52) U.S. Cl.
CPC ............... *G06T 15/08* (2013.01); *G06T 7/70* (2017.01); *G06T 19/20* (2013.01);
(Continued)

(58) Field of Classification Search
CPC .......... G06T 15/08; G06T 7/70; G06T 19/20; G06T 2207/10012; G06T 2207/10081;
(Continued)

(56) References Cited

U.S. PATENT DOCUMENTS

| | | | |
|---|---|---|---|
| 11,386,990 B1 * | 7/2022 | Landon | G16H 30/40 |
| 2014/0185750 A1 * | 7/2014 | Sung | A61B 6/482 |
| | | | 378/41 |

(Continued)

FOREIGN PATENT DOCUMENTS

| | | | | |
|---|---|---|---|---|
| CN | 108451656 A | | 8/2018 | |
| CN | 111145865 A | * | 12/2019 | ............. G16H 20/30 |
| CN | 106663309 B | | 9/2020 | |
| TW | I693922 B | | 5/2020 | |

OTHER PUBLICATIONS

Kurazume, R., Nakamura, K., Okada, T., Sato, Y., Sugano, N., Koyama, T., Iwashita, Y., Hasegawa, T., 2009. 3D reconstruction of a femoral shape using a parametric model and two 2D fluoroscopic images. Computer Vision and Image Understanding 113, 202-211.*

(Continued)

*Primary Examiner* — Jin Ge
(74) *Attorney, Agent, or Firm* — Huan-Yi Lin (57) ABSTRACT

The present invention relates to a method for generating three-dimensional image from two-dimensional images, and more specifically, a method for generating three-dimensional image of human bones from two 2D planar images thereof. The method comprises the steps of: providing a first X-ray planar image and a second X-ray planar image; predicting one set of predicted posture parameters for each of the first X-ray planar image and the second X-ray planar image; and generating the data of a stereoscopic image according to the first X-ray planar image, the second X-ray planar image, and the predicted posture parameters. The present invention also relates to a method for training an artificial intelligence to perform three-dimensional image generation described above.

25 Claims, 10 Drawing Sheets

(52) U.S. Cl.
CPC .............. *G06T 2200/08* (2013.01); *G06T 2207/10012* (2013.01); *G06T 2207/10081* (2013.01); *G06T 2207/10116* (2013.01); *G06T 2207/20068* (2013.01); *G06T 2207/20081* (2013.01); *G06T 2207/20084* (2013.01); *G06T 2207/30008* (2013.01); *G06T 2210/41* (2013.01); *G06T 2219/2016* (2013.01)

(58) Field of Classification Search
CPC . G06T 2207/10116; G06T 2207/20068; G06T 2207/20084; G06T 2207/30008; G06T 2210/41; G06T 2219/2016
USPC ........................................................ 345/424
See application file for complete search history.

(56) References Cited

U.S. PATENT DOCUMENTS

| | | | |
|---|---|---|---|
| 2018/0318014 A1* | 11/2018 | Gangwar | G06T 7/73 |
| 2021/0118134 A1* | 4/2021 | Ferrantelli | G06V 10/776 |
| 2021/0366178 A1* | 11/2021 | Levanony | G06V 10/774 |

OTHER PUBLICATIONS

Kasten, Y., Doktofsky, D. & Kovler, I. End-To-end convolutional neural network for 3d reconstruction of knee bones from bi-planar X-Ray images. ArXiv preprint arXiv: https:// arxiv. org/ abs/ 2004. 00871 (2020).*

Y. Gong. "Decompose X-ray Images for Bone and Soft Tissue". In: ArXiv, vol. abs/2007.14510 (Jul. 2020) (cit. on p. 55).*

* cited by examiner

METHODS FOR GENERATING THREE-DIMENSIONAL IMAGE DATA OF HUMAN BONES

RELATED APPLICATION

This application claims the benefit of the Taiwan Patent Application No. 110120781 filed on Jun. 8, 2021, titled "METHOD AND DEVICE FOR GENERATING THREE-DIMENSIONAL IMAGE DATA OF HUMAN BODY SKELETAL JOINTS," which is incorporated herein by reference at its entirety.

BACKGROUND OF THE INVENTION

Field of the Invention

The present invention relates to a method and device for generating stereoscopic image data, especially a method and device for generating stereoscopic image data of human bones and joints from two-dimensional images.

Description of Related Art

Nowadays, 3D image reconstruction is an important tool for diagnosing bone-related diseases in field of medicine. Presently, the most effective and widely used 3D imaging technology is computed tomography, referred to as CT. Computed tomography is an accurate 3D imaging technique that produces high-resolution information about the internal structure of the human body. However, the multiple X-ray exposures of CT scans result in high radiation doses to patients, and CT scanners are relatively expensive and too bulky to move. Although some 3D image construction methods are currently available and enable construction of stereoscopic images from two planar images, none of them can provide satisfactory results for human bones and joints, especially when the two input planer images are not positioned orthogonally.

Therefore, it is desirable to develop a new method to generate a stereoscopic image from two-dimensional images such as X-ray images.

SUMMARY OF THE INVENTION

To resolve the problems, the present invention provides a method for generating three-dimensional image of human bones, comprising the steps of: providing a first X-ray planar image and a second X-ray planar image captured from a first angle and a second angle of the human bone; predicting, by an image processing engine, one or more sets of predicted posture parameters for the first X-ray planar image and the second X-ray planar image; and generating, by the image processing engine, the data of a stereoscopic image according to the first X-ray planar image, the second X-ray planar image, and the predicted posture parameters.

In one embodiment, before predicting posture parameters the method further comprising removing a first interference image from the first X-ray planar image and removing a second interference image from the second X-ray planar image, wherein each of the first interference image and the second interference image is the background interfering image resulting from non-skeletal objects.

In one embodiment, the image processing engine utilizes a machine learning algorithm, one or more known three-dimensional (3D) validating images, and a plurality of two-dimensional (2D) training images generated from the known 3D validating images to optimize the ability to generate the data of a stereoscopic image. The plurality of 2D training images may be digitally reconstructed from projecting the known 3D validating images at different angles. In a specific embodiment, the known 3D validating images are CT images.

In one embodiment, the machine learning algorithm is a convolution neural network (CNN).

In one embodiment, the plurality of 2D training images comprises a set of training posture parameters. The training posture parameters may comprise the rotation angles for each of the plurality of 2D training images around x, y and z axis, and may also comprise an angle $\theta$ representing the bending angle of a joint.

In one embodiment, the predicted posture parameters comprise a set of first predicted posture parameters for the first X-ray planar image and a set of second predicted posture parameters for the second X-ray planar image. The predicted posture parameters may comprise the rotation angles for each of the first X-ray planar image and the second X-ray planar image around x, y and z axis. Also, it may further comprise an angle $\theta$ representing the bending angle of a joint in the first X-ray planar image and the second X-ray planar image.

Another aspect of the present invention is to provide a machine learning method for training a machine with image data of human bones, comprising the steps of: providing one or more three-dimensional (3D) validating image associated with human bones; providing a plurality of two-dimensional (2D) training images, each of which is a projected image generated from one of the 3D validating images in a specific angle defined as an angle parameter associated with the 2D training image; and training the machine with the 3D validating images, the plurality of 2D training images, and the angle parameters associated with the plurality of 2D training images, wherein the machine after training is able to generate a 3D target image from two 2D input images representing different projections of the 3D target image.

Other objectives, advantages and novel features of the invention will become more apparent from the following detailed description when taken in conjunction with the accompanying drawings.

BRIEF DESCRIPTION OF THE DRAWINGS

FIG. 6A is the CT reference which generates the two input images, and FIG. 6B-6E are the constructed 3D images using the two generated input images.

FIG. 6B is the construction result of two 2D X-ray images with both interference images retained; FIG. 6C is the construction result with the interference image of anterior-posterior view removed; FIG. 6D is the construction result with the interference image of lateral view removed; and FIG. 6E is the result where both interference images are removed. The multi-scale structural similarity (MS-SSIM) values are also provided below each figure.

FIG. 11A is the CT reference used to generate input images, and FIG. 11B-11D are the output 3D images. FIG. 11B is an output 3D image constructed from two orthogonal input images; FIG. 11C is an output 3D image constructed from two non-orthogonal input images without consideration of the posture parameters; FIG. 11D is an output 3D image constructed from two non-orthogonal input images with consideration of the predicted posture parameters. The MS-SSIM values are also provided below each figure.

REFERENCE SIGNS

10: Image processor
11: Image display
131: First X-ray planar image
132: Second X-ray planar image
1310: First interference image
1320: Second interference image
133: Skeletal planar image
141, 142: arrows
19: Three-dimensional object forming device
Step 21-24: Process steps
30: Femur
31: Tibia
θ: Angle
X, Y, Z: Coordinates

DETAILED DESCRIPTION OF PREFERRED EMBODIMENTS

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), graphics processing units (GPUs), etc.

Figure 1A:
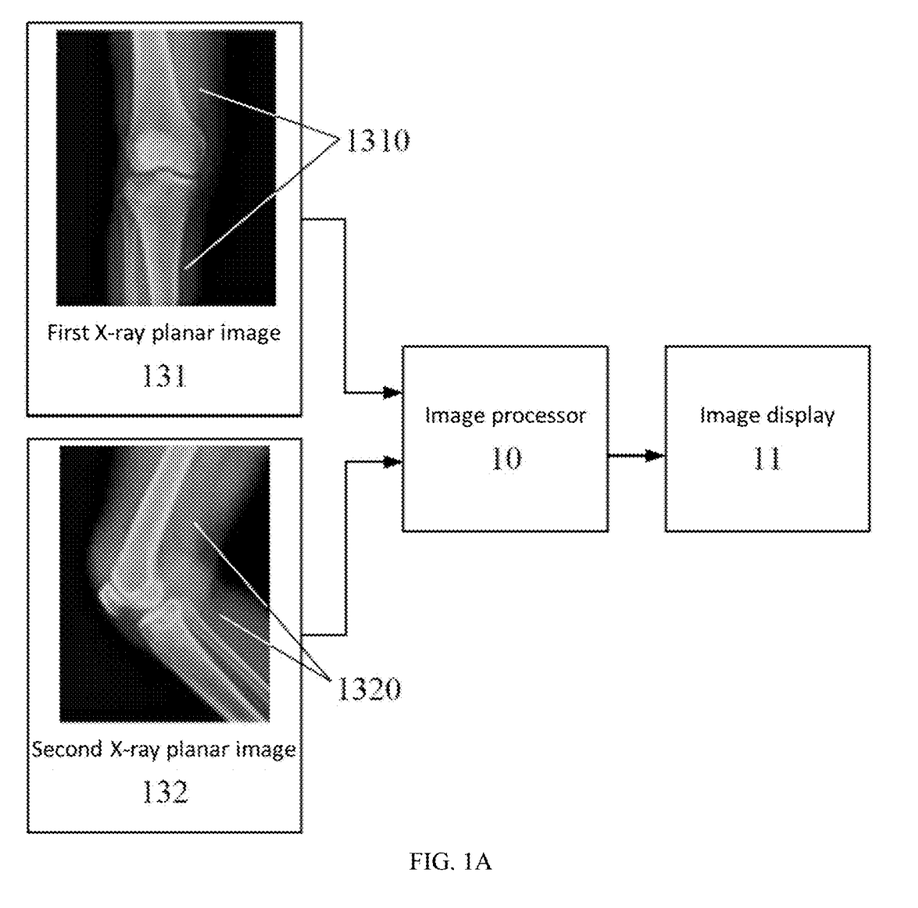
FIG. 1A is the block diagram of a preferred embodiment of a stereoscopic image data generating apparatus developed in the present application.
Figure 1B:
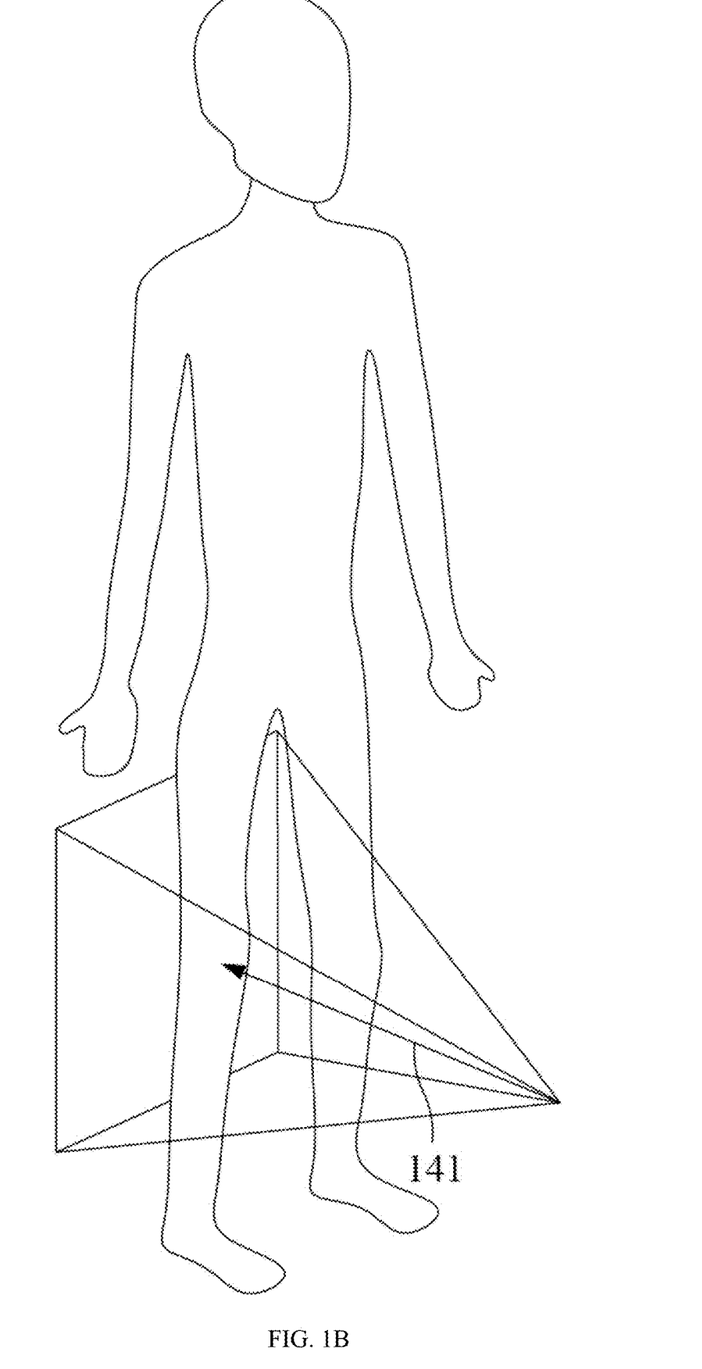
FIG. 1B is a schematic diagram of the first angle defined in this application.
Figure 1C:
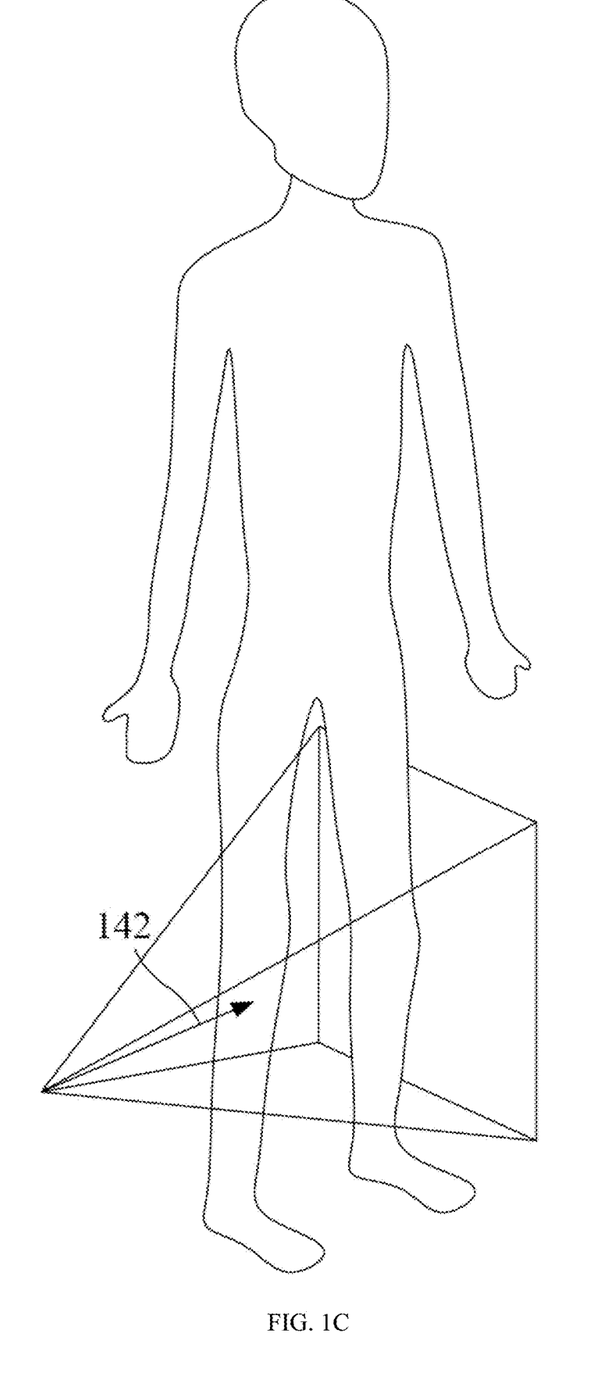
FIG. 1C is a schematic diagram of the second angle defined in this application.
Figure 2:
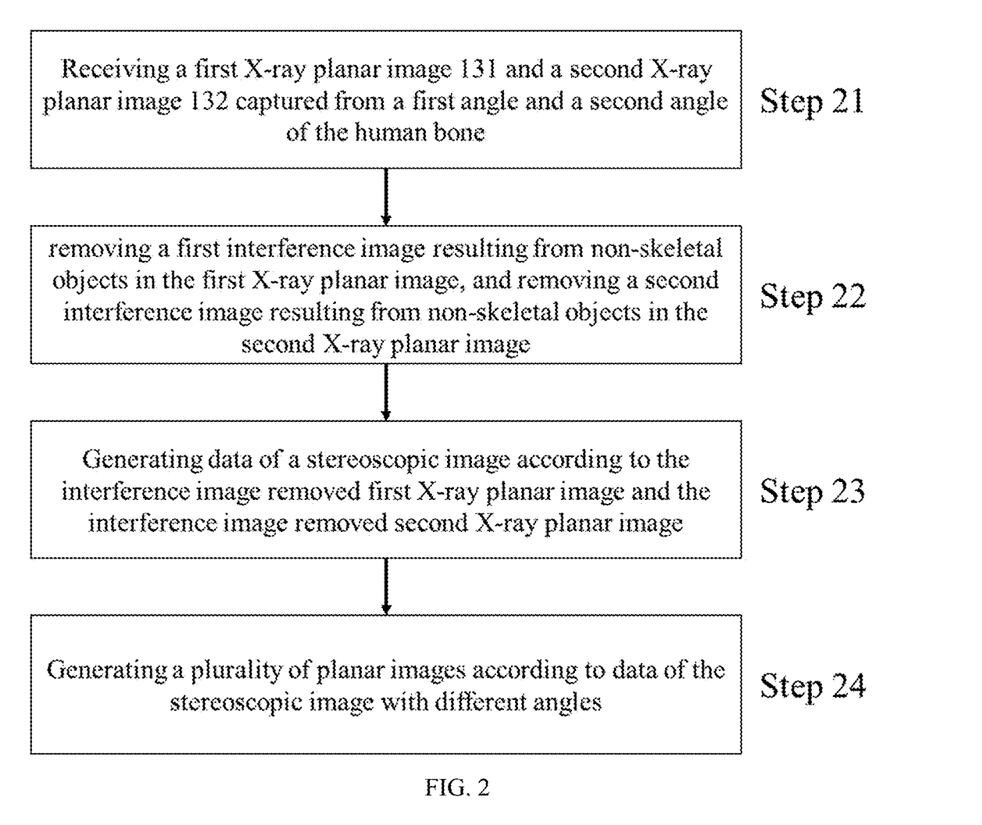
FIG. 2 is a step flow chart of the developed method for generating stereoscopic image data of bones.

In the present application, an apparatus and method for generating three-dimensional image data is provided. A block diagram of a preferred embodiment of the apparatus is shown in FIG. 1A. The apparatus disclosed in this application can be applied to the reconstruction of stereoscopic images and density of human skeleton and joints. It comprises an image processor 10 and further comprises an image display 11 in one embodiment. The image processor 10 can perform the method for generating stereoscopic image data of bones as shown in the flowchart of FIG. 2, wherein step 21 is to receive a first X-ray planar image 131 and a second X-ray planar image 132 captured from a first angle and a second angle of the human bone, respectively. Each of the first angle and the second angle refers to a specific angle for photographing the human bones and joints (for example, the arrows 141 and 142 shown in FIG. 1B and FIG. 1C respectively and the front of the right knee are respectively formed two angles). The best angle between the first angle and the second angle is 90 degrees but other angles are also possible.

Figure 1D:
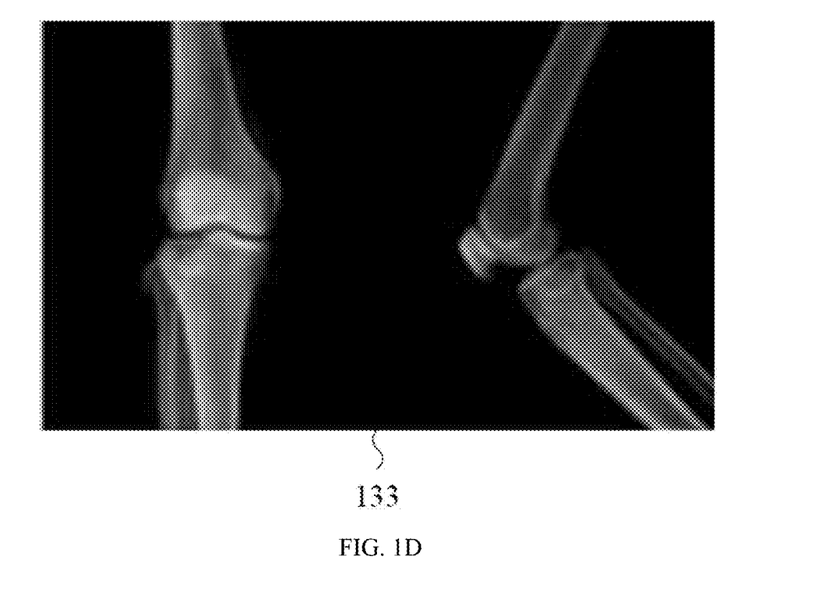
FIG. 1D shows a skeletal planar X-ray image with a relatively cleaner skeletal image.

Step 22 is to remove a first interference image 1310 caused by non-skeletal objects in the first X-ray planar image 131, and a second interference image 1320 caused by non-skeletal objects in the second X-ray planar image 132. Most of the above-mentioned non-skeletal objects are soft tissues (such as human muscles) or non-human tissues (such as clothing or surgical implants). The method in step 22 for removing the interfering images caused by non-skeletal objects may be an existing image processing method (e.g., an image background removal algorithm), which automatically removes the images generated by the non-skeletal objects, so as to generate a cleaner skeletal image (the skeletal planar image 133 as shown in FIG. 1D). The interference image removal method (e.g., the image background removal algorithm) may also be trained by an artificial intelligence technology to increase its accuracy.

Step 23 is to perform image processing on the first X-ray planar image and the second X-ray planar image after removing the interference images. The image processing may generate a stereoscopic image data file according to the first X-ray plane image and the second X-ray planar image after removing interference images, and may generate a plurality of planar images with different angles from the stereoscopic image data file (step 24). As for the image display 11, it may electrical connected to the image processor 10 by signal to receive the plurality of planar images of different angles generated by the stereoscopic image data file and display them respectively, so that the viewer can see the images with stereoscopic sense.

In one embodiment, in order to reduce the burden of computing resources, only one of the first X-ray planar image and the second X-ray planar image is selected to remove the corresponding interference image (i.e. first interference image 1310 or second interference image 1320), and the other X-ray planar retains its interference image. Even so, after the image processing is performed, a stereoscopic image data file with quality better than the prior art can still be obtained.

Figure 3A:
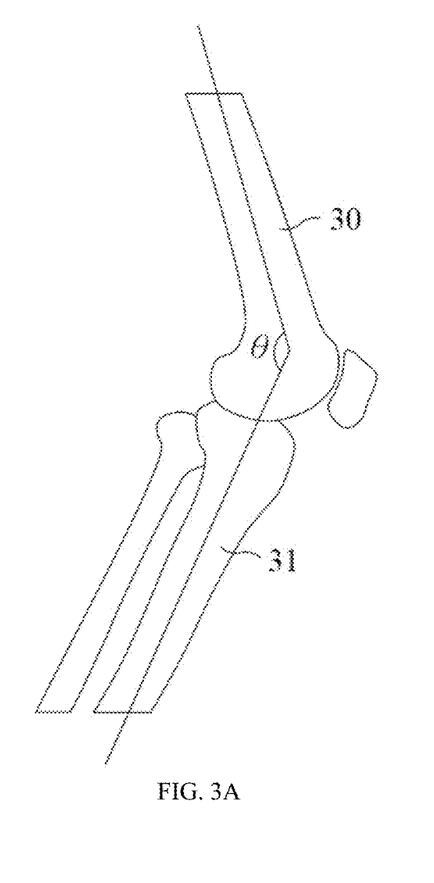
FIG. 3A shows the posture parameter of the joint bending angle $\theta$ in the present application.
Figure 3B:
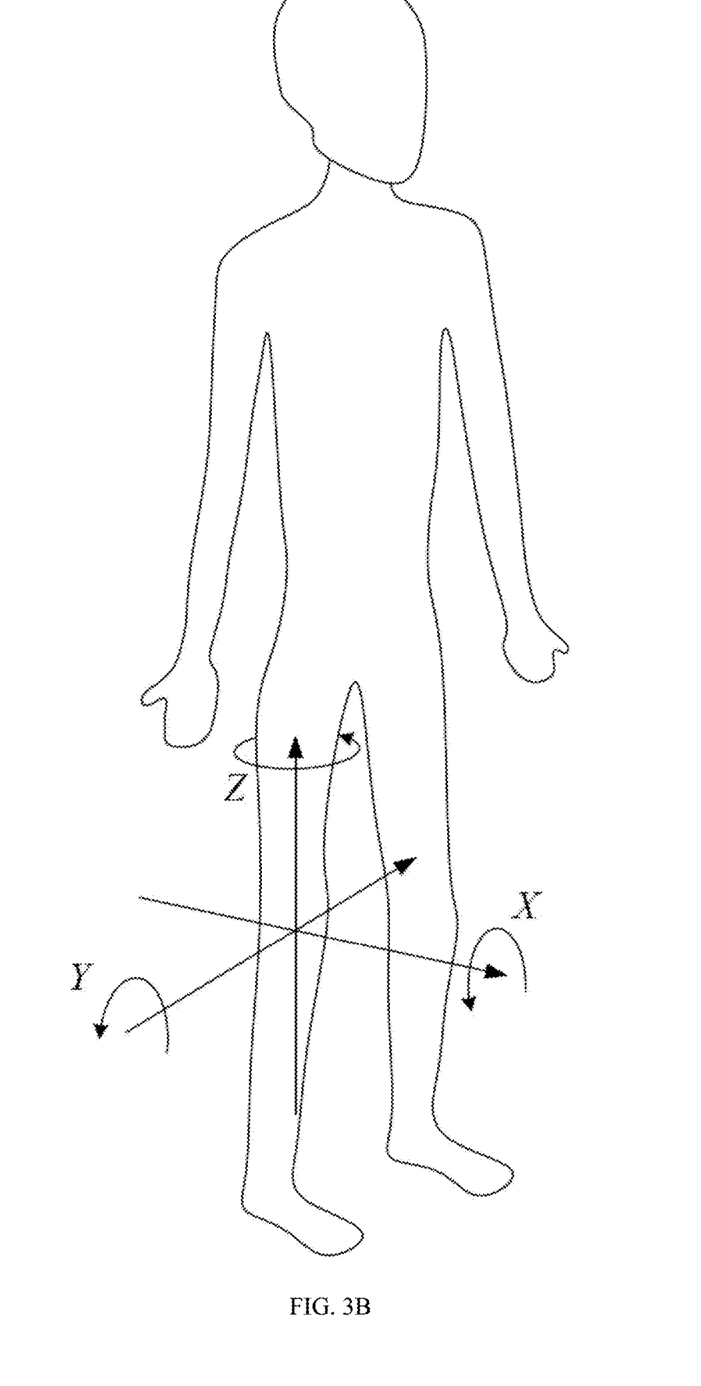
FIG. 3B shows the posture parameters of the three-axis' rotational angles (x, y, and z) of the knee joint in the present application.

The image processing in the step 23 may be optionally performed by an image processing engine. In a preferred embodiment, the image processing engine may be an artificial intelligence image processing engine, which utilizes a machine learning algorithm, one or more known three-dimensional images, and a plurality of training planar images projected from the known three-dimensional images for optimization. The said machine learning algorithm may be an iterative convolutional neural network algorithm. As for the plurality of training planar images, any of which is an X-ray planar image containing posture parameters of the skeleton and/or joint in the three-dimensional images. For example, the X-ray planar image used for training can be an X-ray planar image (such as a hospital medical record image) exposed by a general X-ray machine, but undergoes image recognition before it is input to the image processing engine for machine learning, wherein the recognition is to estimate the posture parameters corresponding to the skeleton and/or joint, and the posture parameters represent the posture variation of the skeleton and the joint. For example, as shown in FIGS. 3A and 3B, when the skeletal joint is a knee joint, the posture parameters may comprise the joint bending angle θ between the femur 30 and the tibia 31 (as shown in FIG. 3A) and the three-axis rotational angles x, y, z to the knee joint itself (shown in FIG. 3B). As such, the machine learning algorithm may be simultaneously trained according to the X-ray planar image and various posture parameters, so that further optimize the ability of the image processing engine to generate the stereoscopic image data file. In addition, a plurality of X-ray planar images for training may also be generated from a known stereoscopic image data file set at different angles, and the known stereoscopic image data file can be an image data files that have been completed by any means (such as computed tomography).

Accordingly, the image processing in step 23 may comprise the following steps: estimating a set of first posture parameters according to the first X-ray planar image, estimating a set of second posture parameters according to the second X-ray planar image, and generating a stereoscopic image data according to the first X-ray planar image, the second X-ray planar image, the set of first posture parameters, and the set of second posture parameters. The first and second X-ray planar images are firstly subjected to image recognition to calculate the posture parameters corresponding to the skeletal joint. For example, as shown in FIG. 3A and FIG. 3B, when the skeletal joint is a knee joint, the posture parameters may comprise the joint bending angle θ between the femur 30 and the tibia 31 (FIG. 3A) and the three-axis rotational angles x, y, z of the knee joint itself (FIG. 3B). As can be seen from the above, the image processing may also generate a stereoscopic image data file according to the X-ray planar image and the posture parameters at the same time, and the resulting stereoscopic image data file will be closer to its real appearance.

In addition, since the brightness of each pixel in the X-ray planar image shown in FIG. 1D represents the tissue density of the point, the reconstructed 3D image data file can be a collection of voxels representing tissue density. That is, there is also an intensity value (I) corresponding to the three-dimensional coordinates (X, Y, Z) for each voxel point.

Since the reconstructed image file in present invention is a stereoscopic image data file, the image display 11 shown in FIG. 1 may be a general flat-panel display, and the image processor 10 may generate a plurality of planar images from different angles of the stereoscopic image. The flat-panel display may then be used to switch and display the above-mentioned planar images of different angles, so that the viewer can have a feeling of three-dimension (e.g. rotational display from various angles). In addition, the image display 11 may also be a device like a virtual reality display or an augmented reality display, which may be used to receive the stereoscopic image data file to directly display a 3D image with a stereoscopic sense. In this way, the disclosed apparatus may allow doctors and patients to fully communicate the patients' conditions. In addition, the method of the present application may further comprise the following steps: utilizing the stereoscopic image data file to estimate a physiological anatomical feature of the skeleton or joint (such as the size of the bone), the position, or the relative geometric relationship in the three-dimensional space. The above information can be used for disease diagnosis, surgical evaluation or assistive device design. For example, the relative geometric relationship of the skeleton and joint may be an inter-joint bone distance data or the proportional size of a group of specific bones. The inter-joint bone distance data may be knee joint distance data, and the proportional size of the specific group of bones may be the proportions of the femur, tibia, patella and fibula in the knee joint. According to the above information, the doctor may be able to determine the stage of knee osteoarthritis, and provide appropriate advice and treatment.

Figure 4:
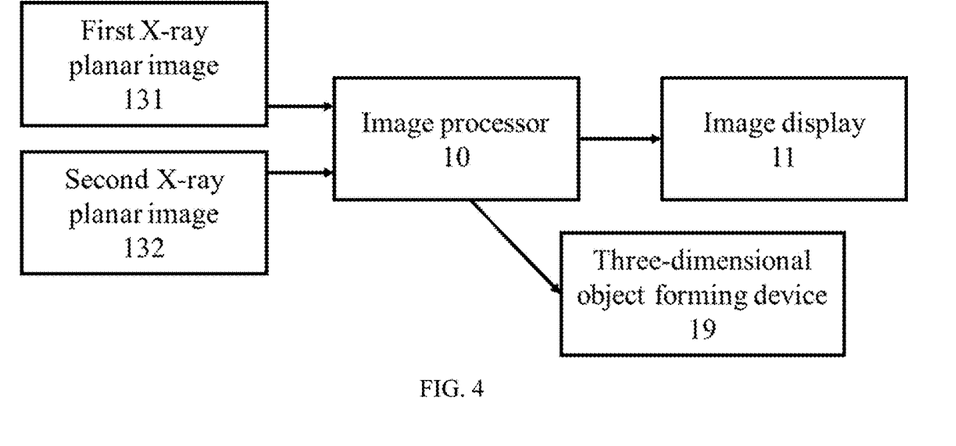
FIG. 4 is the block diagram of another preferred embodiment of the stereoscopic image data generating apparatus developed in the present application.

Furthermore, each voxel in the estimated stereoscopic image data file in the present invention may comprise a set of three-dimensional coordinate data and a characteristic value, and the characteristic value may represent tissue density. Moreover, after the stereoscopic image file is processed by image recognition, a group of skeleton model annotations can be defined (for example, a certain part of the stereoscopic image file is automatically marked as the name of a certain bone). In this way, as shown in FIG. 4, the present invention may further comprise a three-dimensional object forming device 19 (such as a 3D printer), which is electrical connected to the image processor 10 by signals for receiving the three-dimensional image data file. The three-dimensional object forming device 19 may fabricate a three-dimensional object (such as a certain bone or a repair part in a joint) with a restored tissue density according to the bone model annotation in the three-dimensional image data file. In addition, the voxel set that can represent the tissue density may also project a two-dimensional image with a density distribution state. Both the voxel set or the two-dimensional image with the density distribution state may be used to estimate the bone strength or fracture risk at that position.

EXAMPLE

The following example is provided to further illustrate the image processing method as claimed.

1. Interference Image Removal

In step 22, The two X-ray two dimensional images (the first X-ray two-dimensional image 131 and the second X-ray two-dimensional image 132) are obtained by a normal X-ray machine. Both the first interference image and the second interference image are removed from the X-ray images for a better reconstruction quality.

The first step of interference image removal utilizes a U-net neural network to segment the bone area of the input image. The U-net is a well-known convolutional neural network architecture, which is trained in advance by a training model using a bone data collection with labeling.

The second step of interference image removal takes the pixel values around the bone contour, predict soft tissue values over the region by solving a Laplace equation and then subtract the soft tissue values from the input image, as described by Gong in journal article titled "Decompose X-ray Images for Bone and Soft Tissue" (arXiv: 2007.14510v1). In brief, with the input X-ray image f(x, y), obtain the mask M(x, y) by active contour or user input, then compute the soft tissue interference image S(x, y) by solving the equation below:

$$\Delta S_M = 0, s.t.\ S_{\partial M} = f_{\partial M}, \quad \text{(Eq. 1)}$$

where $\partial$ denotes the boundary. After calculating S(x, y), compute $\alpha$ value by the following equation:

$$\alpha \equiv \frac{1}{\max\left\{\frac{f(x,y) - S(x,)}{1 - S(x,y)}\right\}} \quad \text{(Eq. 2)}$$

Lastly, compute the soft tissue interference image removed bone image U(x, y) by the equation below:

$$U(x, y) = \alpha \frac{f(x, y) - S(x, y)}{1 - S(x, y)} \quad \text{(Eq. 3)}$$

Figure 5:
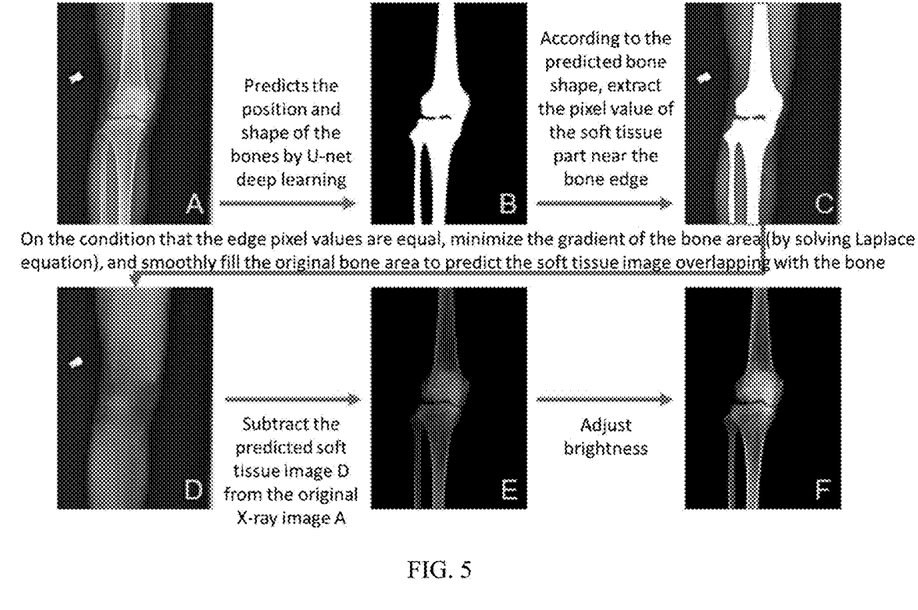
FIG. 5 shows the process of interference image removal in the example.

The U(x, y) described in Eq. 3 is the desired bone image with interference image removed. FIG. 5 shows the interference image removal process by the above method.

Figure 6:
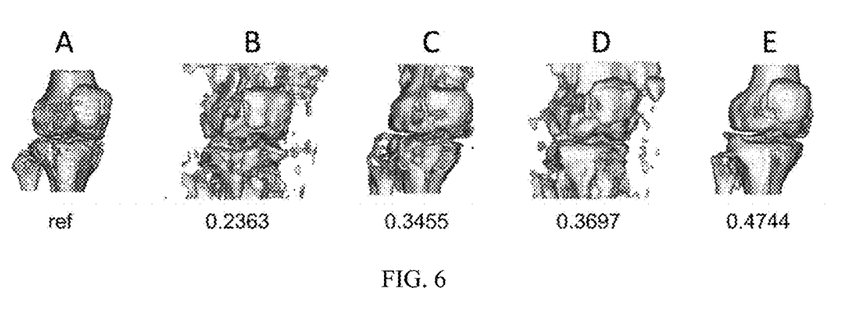
FIG. 6 shows the reconstructed 3D image quality improved by interference image removal.

The interference image removal described is an important step to produce good quality 3D image, as shown in FIG. 6. FIG. 6A is the CT reference which generates the two input images, and FIG. 6B-6E are the constructed 3D images using the two generated input images. The multi-scale structural similarity (MS-SSIM) values are also provided below each figure. FIG. 6B shows the construction result of two 2D X-ray images with both interference images retained, FIGS. 6C and 6D are the construction result with one of the interference images removed, and FIG. 6E is the result where both interference images are removed. From the above result, it is clear that removing the interference images from the input is essential for constructing good quality images.

2. Three-Dimensional Image Generation
2.1 Training of Artificial Intelligence
2.1.1 Training Data Collection The image processing procedure in step 23 is performed by an artificial intelligence image processing engine. The artificial intelligence image processing engine is as described by Ying et al. in journal article titled "X2CT-GAN: Reconstructing CT from Biplanar X-Rays with Generative Adversarial Networks" (arXiv:1905.06902v1), except that the AI also implements posture parameters prediction and uses the prediction results in 3D image construction.

In detail, the AI is trained by sets of artificial X-ray two-dimensional images which are generated from corresponding CT images. The training data are pairs of anterior-posterior X-ray image, lateral X-ray image, posture parameters x, y, z, $\theta$, and ground truth CT 3D volume. The anterior-posterior X-ray image and lateral X-ray image are generated by digitally reconstructed radiograph (DRR) from ground truth CT 3D volume. This process is to project all data points in CT 3D volume to a 2D surface with respect to a camera point using simple trigonometric calculations.

Figure 7:
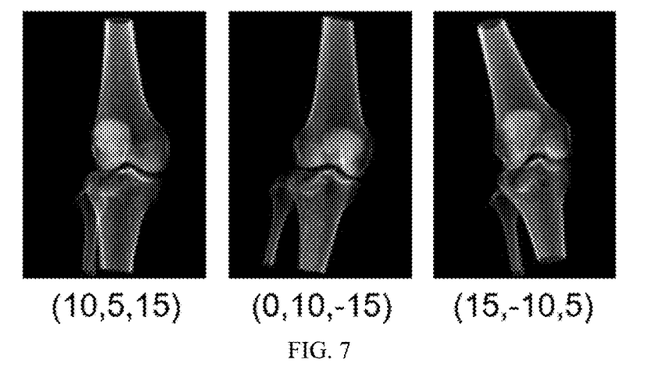
FIG. 7 shows an example of generated training 2D surface with labeled posture parameters.

To generate training data with rotation parameters (x, y, z), the ground truth CT 3D volume is rotated with respect to x-axis, y-axis, and z-axis by different amounts of angles (x, y, z). The rotated 3D volume forms a point cloud in three-dimensional space. Then, a DRR is generated by projecting from a camera point through all points in the 3D point cloud to a 2D surface. FIG. 7 shows an example of generated training 2D surface with labeled posture parameters. The training data of 2D simulated X-ray paired with known posture parameters by projecting 3D CT images with all kinds of different parameters are used to train a regression neural network.

The knee joint bending parameter $\theta$ is generated by manipulating the components of the ground truth CT 3D volume. Since CT are commonly scanned while knee joint are stretched straight, by rotating the femur component or the tibia component with respect to the knee joint center axis, the 3D volume of bended knee is simulated. Then DRRs with different rotation parameters using the $\theta$-bended 3D volume are generated.

2.1.2 Loss Calculation in Model

Figure 8:
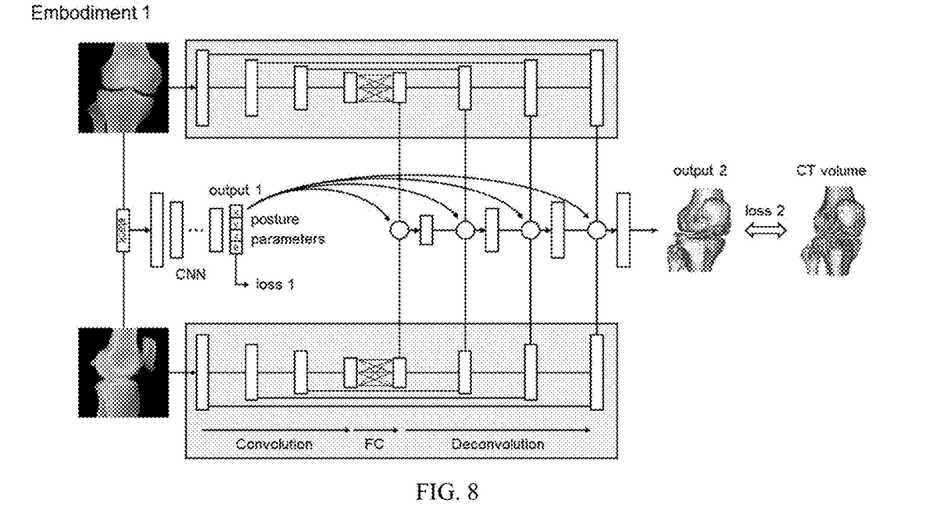
FIG. 8 shows the first embodiments to implement AI training for constructing stereoscopic image.
Figure 9:
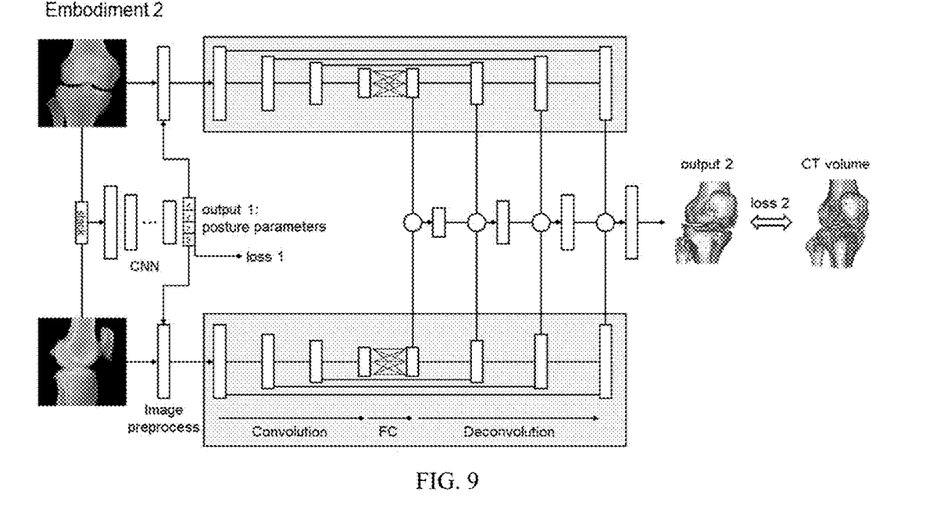
FIG. 9 shows the second embodiments to implement AI training for constructing stereoscopic image.
Figure 10:
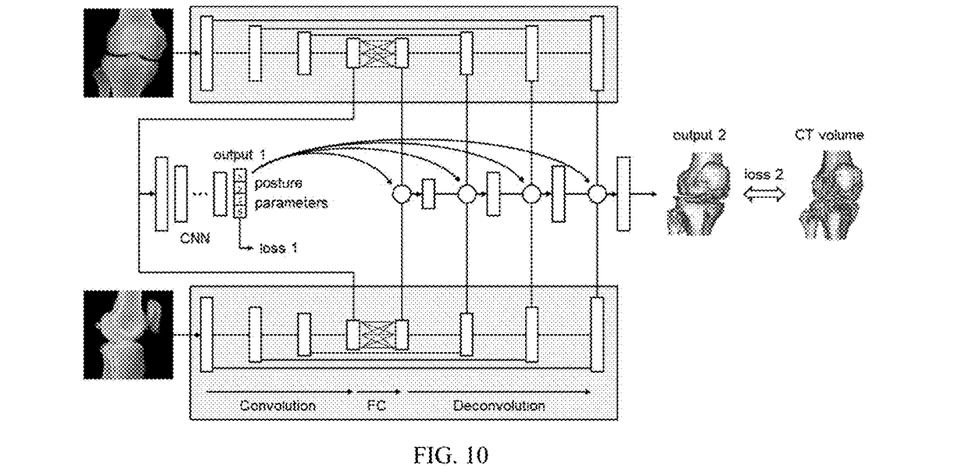
FIG. 10 shows the third embodiments to implement AI training for constructing stereoscopic image.

FIG. 8-FIG. 10 show 3 different embodiments to implement the training. As those figure show, two losses are calculated during training. Loss 1 is the loss from posture parameters, we can calculate mean absolute error or mean squared error as the loss function during training:

$$\text{loss}_{MAE} = \tfrac{1}{4}(|x_{pred} - x_{true}| + |y_{pred} - y_{true}| + |z_{pred} - z_{true}| + \theta_{pred} - \theta_{true}|)$$

$$\text{loss}_{MSE} = \tfrac{1}{4}((x_{pred} - x_{true})^2 + (y_{pred} - y_{true})^2 + (z_{pred} - z_{true})^2 + (\theta_{pred} - \theta_{true})^2)$$

Loss 2 is the loss from generated 3D volume, we can also calculate mean absolute error or mean squared error between the predicted and ground truth 3D volume as the loss function:

$$\text{loss}_{MAE} = \frac{1}{V_N}\sum_{k=0}^{V_N}|V_{pred_i} - V_{true_i}|, \ \text{loss}_{MSE} = \frac{1}{V_N}\sum_{k=0}^{V_N}(V_{pred_i} - V_{true_i})^2$$

In addition, loss 2 also added projection loss which encourages the projection images on each three dimensions between predicted and ground truth volumes are alike.

2.1.3 Posture Parameters Application in Model

In embodiment 1 (FIG. 8) and 3 (FIG. 10), posture parameters are applied when combining two 3D feature matrices derived from input 1 and input 2. Conventional method rotates one of the matrix 90 degrees invariably before summing them together. The method of the present invention, however, considers the rotation parameters, rotating both matrices with respect to x-axis, y-axis, and z-axis according to the parameters to make them orthogonal. This leads to a more ideal result if the input X-ray images are not filmed rightly in shooting angle. Also, the upper and lower part of the matrices can be rotated by knee joint bending parameter $\theta$ with respect to the matrix center axis to retrieve 3D volume of straight stretched knee.

Besides directly using the posture parameters to rotate both matrices, it's also possible to concatenate or perform matrix multiplication of those parameters with specific layer(s) of the convolutional neural network (CNN) before combining the 3D feature matrices derived from input 1 and input 2. This leaves the model itself to learn the best combining weights from the posture parameters to reconstruct the final 3D volume.

In embodiment 2 (FIG. 9), the posture parameters are applied on 2D input X-ray images. The input images are adjusted into other images as if they were shot orthogonally by doing image affine transformation, or again concatenate or perform matrix multiplication of those parameters with specific layer(s) of the convolutional neural network (CNN), making the layers learn the orthogonal images.

2.2 Three-Dimensional Image Generation and the Results

During 3D image construction, the CNN model described by Ying et al. (arXiv:1905.06902v1) is implemented, but the matrix is rotated according to the posture parameters instead of 90 degrees. The "Connection-C" procedure described in Ying et al. is to rotate one of the 3D matrix 90 degrees before summing together. In the present invention, the matrix is rotated according to the predicted posture parameter values rather than 90 degrees.

Figure 11:
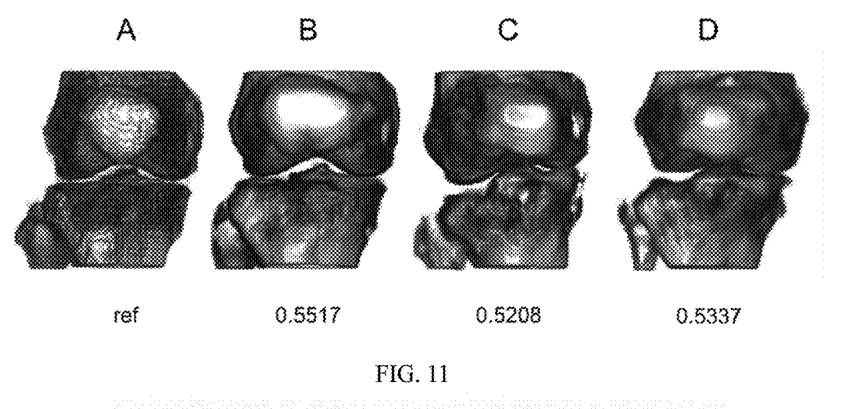
FIG. 11 shows the reconstructed 3D image quality influenced by non-orthogonal inputs and improved by consideration of posture parameters.
Figure 12:
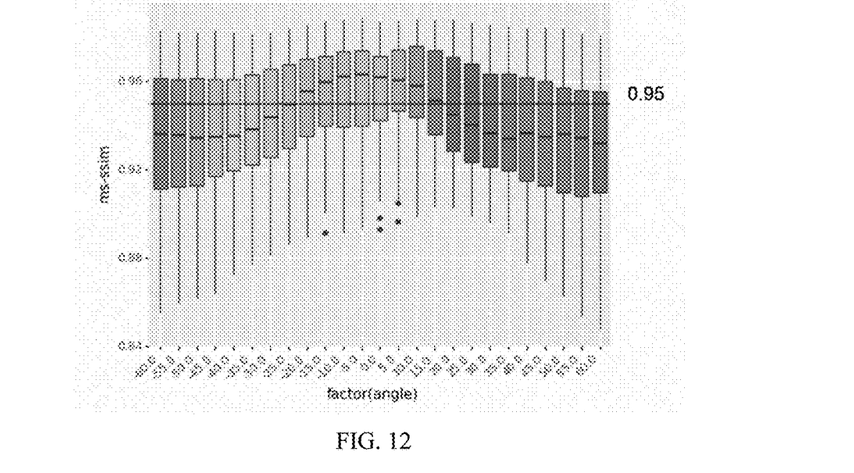
FIG. 12 shows MS-SSIM performance versus rotation angle for 3D images constructed from two planar images with different angles. The angle value shown on X-axis is the angle deviates from orthogonal (90 degrees).

The application of the posture parameter makes the model more robust when the two input X-ray images are not orthogonal, as illustrated in FIG. 11. FIG. 11A is the CT reference used to generate input images, and FIG. 11B-11D are the output 3D images. FIG. 11B is an output 3D image constructed from two orthogonal input images. FIG. 11C is an output 3D image constructed from two non-orthogonal input images without consideration of the posture parameters, i.e. the two input images are processed as if they were orthogonal to each other. The output image in FIG. 11C is skewed. FIG. 11D is an output 3D image constructed from two non-orthogonal input images with consideration of the predicted posture parameters, and the output image is normal (not skewed) compared to FIG. 11C. The MS-SSIM values are also provided below each figure. The result indicates that the inclusion of predicted posture parameters improves the quality of generated 3D image when the angle of the two input images deviates from 90 degrees, as shown from the MS-SSIM values. The result of MS-SSIM performance versus rotation angle is shown in FIG. 12, indicating that the model's performance degraded significantly if angle correction was not applied.

Figure 13:
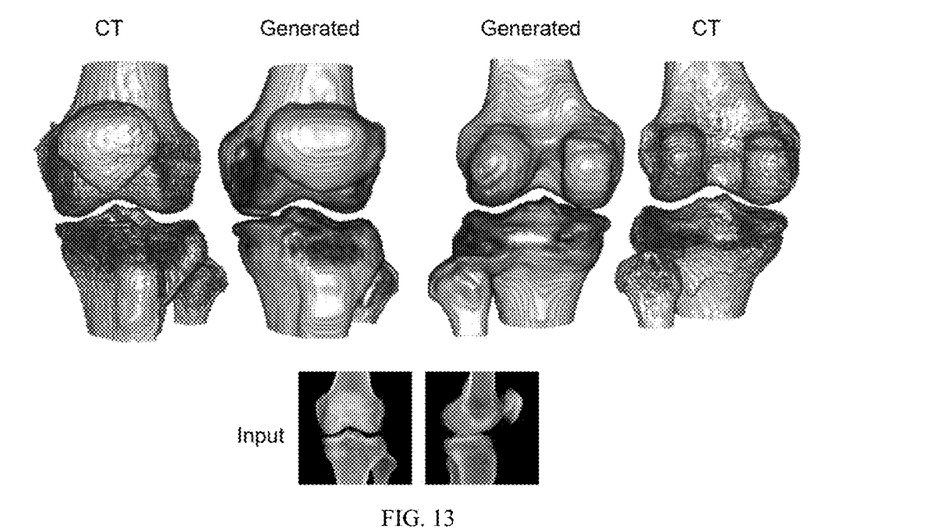
FIG. 13 shows a comparison between generated 3D image and original CT 3D image, with MS-SSIM value 0.81641. The two input images generated from the CT 3D image are also provided below.

The 3D image generated by the claimed method is with high fidelity. The comparison between generated 3D image and real CT 3D image is evaluated by multi-scale structural similarity (MS-SSIM) index. The MS-SSIM among a test set with 22 test data is 0.746±0.0955. FIG. 13 also provides an example of comparison between generated 3D image and CT 3D image, with MS-SSIM value 0.81641.

Figure 14:
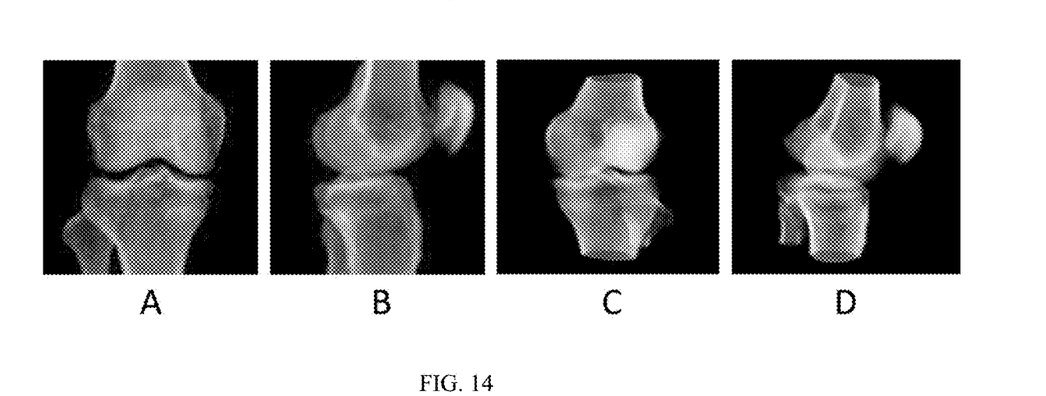
FIG. 14 shows the construction result (C and D) from the input images (A and B). The two images on the right (C and D) are the generated three-dimensional image with intensity information. The whiteness (opacity) in the images represents the intensity values.

The disclosed 3D image generation method not only provide a method to generate the contour of a 3D image from 2D images, but also provides the intensity of each voxel in the constructed 3D image. As described in previous paragraphs, the brightness of each pixel in the planar images represents the tissue density at that point, so the stereoscopic image data reconstructed from the two X-ray planar images by the method is a collection of voxels that representing tissue density at each point. That is, there is also an intensity value (I) corresponding to the three-dimensional coordinates (X, Y, Z) of each voxel point, as shown in FIG. 14. The two images on the left are the input images, and the two images on the right are the generated three-dimensional image. The whiteness (opacity) in the images represents the intensity values, which are also recorded in the output data.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A method for generating a three-dimensional image of human bones, comprising the steps of:
   providing a first X-ray planar image and a second X-ray planar image captured from a first angle and a second angle of the human bones;
   predicting, by an image processing engine, one or more sets of predicted posture parameters for the first X-ray planar image and the second X-ray planar image; and
   generating, by the image processing engine, the data of the three-dimensional image according to the first X-ray planar image, the second X-ray planar image, and the predicted posture parameters;
   wherein the image processing engine comprises a machine learning model trained by a machine learning algorithm for generating both the predicted posture parameters using a first loss and the data of the three-dimensional image using a second loss, and wherein the first loss which evaluates errors of posture parameters and the second loss which evaluates errors of generated three-dimensional image are both calculated in every iteration during training of the machine learning model.

2. The method of claim 1, before predicting posture parameters further comprising:
   removing a first interference image from the first X-ray planar image; and
   removing a second interference image from the second X-ray planar image.

3. The method of claim 2, wherein each of the first interference image and the second interference image is the background interfering image resulting from non-skeletal objects.

4. The method of claim 1, wherein the image processing engine utilizes a machine learning algorithm, one or more known three-dimensional (3D) validating images, and a plurality of two-dimensional (2D) training images which are projections of the known 3D validating images to improve the ability to generate the data of the three-dimensional image.

5. The method of claim 4, wherein the plurality of 2D training images is digitally reconstructed from projecting the known 3D validating images at different angles.

6. The method of claim 5, wherein the known 3D validating images are CT images.

7. The method of claim 4, wherein each of the plurality of 2D training images comprises a set of training posture parameters.

8. The method of claim 7, wherein the training posture parameters comprise the rotation angles for each of the plurality of 2D training images around x, y and z axis.

9. The method of claim 8, wherein the training posture parameters further comprise an angle θ representing the bending angle of a joint.

10. The method of claim 1, wherein the predicted posture parameters comprise a set of first predicted posture parameters for the first X-ray planar image and a set of second predicted posture parameters for the second X-ray planar image.

11. The method of claim 10, wherein the predicted posture parameters comprise the rotation angles for each of the first X-ray planar image and the second X-ray planar image around x, y and z axis.

12. The method of claim 11, wherein the predicted posture parameters further comprise an angle θ representing the bending angle of a joint in the first X-ray planar image and the second X-ray planar image.

13. The method of claim 12, wherein both the set of first predicted posture parameters and the set of second predicted posture parameters comprise the bending angle of a knee joint between femur and tibia, and the three-axis rotation angle of the knee joint itself.

14. The method of claim 4, wherein the machine learning algorithm is a convolution neural network (CNN).

15. The method of claim 1, wherein the data of the three-dimensional image are a set of voxels representing bone density of the corresponding positions.

16. The method of claim 15, wherein the data of the three-dimensional image comprises a set of bone model annotation.

17. The method of claim 4, wherein each of the plurality of 2D training image corresponds to another one of the plurality of 2D training image to form a 2D training image pair, and wherein the two images in the 2D training image pair are projections of the same known 3D validating image.

18. The method of claim 17, wherein each 2D training image pair comprises a set of training posture parameters.

19. The method of claim 18, wherein the training posture parameters comprise the rotation angles for the 2D training image pair around x, y and z axis.

20. The method of claim 19, wherein the training posture parameters further comprise an angle θ representing the bending angle of a joint.

21. The method of claim 18, wherein the training posture parameters comprise a training angle representing the angle between the two of the plurality of 2D training images in the 2D training image pair.

22. The method of claim 1, wherein the predicted posture parameters comprise the rotation angles of the human bones around x, y and z axis.

23. The method of claim 22, wherein the predicted posture parameters further comprise an angle θ representing the bending angle of a joint shown in the first X-ray planar image and the second X-ray planar image.

24. The method of claim 23, wherein the predicted posture parameters comprise the bending angle of a knee joint between femur and tibia, and the three-axis rotation angles of the knee joint itself.

25. The method of claim 1, wherein the predicted posture parameters comprise a predicted angle representing the shooting angle between the first X-ray planar image and the second X-ray planar image.

* * * * *